United States Patent [19]

Sparer

[11] Patent Number: 5,332,539
[45] Date of Patent: Jul. 26, 1994

[54] NON-CONTACT LINEAR POSITION TRANSDUCER FOR AN INJECTION MOLDING MACHINE AND METHOD OF USING

[75] Inventor: Ronald M. Sparer, Madeira, Ohio

[73] Assignee: Cincinnati Milacron Inc., Cincinnati, Ohio

[21] Appl. No.: 37,758

[22] Filed: Mar. 26, 1993

[51] Int. Cl.$^5$ .................. B29C 45/04; B29C 45/80
[52] U.S. Cl. .................. 264/40.1; 264/40.2; 264/40.5; 264/328.1; 356/375; 425/138; 425/150
[58] Field of Search ............ 264/40.1, 40.2, 40.5, 264/328.1; 425/138, 150; 356/373, 375, 400

[56] References Cited

U.S. PATENT DOCUMENTS

| | | |
|---|---|---|
| 3,037,420 | 6/1962 | Stade . |
| 4,131,596 | 12/1978 | Allen .................. 425/150 |
| 4,715,714 | 12/1987 | Gaechter et al. .................. 356/375 |
| 4,726,920 | 2/1988 | Yokota .................. 264/40.1 |
| 4,880,992 | 11/1989 | Neidermayr et al. .................. 250/561 |
| 4,892,690 | 1/1990 | Buja .................. 264/40.1 |
| 4,991,965 | 2/1991 | Busch .................. 356/373 |
| 5,122,660 | 6/1992 | Yoshii et al. .................. 250/237 |

FOREIGN PATENT DOCUMENTS

| | | | |
|---|---|---|---|
| 57-116622 | 7/1982 | Japan .................. | 264/40.1 |
| 63-7925 | 1/1988 | Japan .................. | 425/150 |
| 4-52120 | 2/1992 | Japan .................. | 425/138 |
| 4-307219 | 10/1992 | Japan .................. | 425/150 |
| 1669743 | 8/1991 | U.S.S.R. .................. | 425/138 |

*Primary Examiner*—Mathieu Vargot
*Attorney, Agent, or Firm*—Stephen H. Friskney

[57] ABSTRACT

An apparatus for indirectly measuring relatively long, linear distances associated with the operation of an injection molding machine. In particular, the method and apparatus of the present invention can be used to determine the distance between two machine components or systems that are capable of relative (linear) movement. The apparatus includes a rigid bar that extends over the distance traversed by the components of interest, the bar being oriented at a slight angle relative to the line of movement. Immediately adjacent the bar is a sensing element capable of accurately determining the relatively short distance between the sensor and the bar. It is contemplated that the bar would be associated with one of the machine components and the sensor connected to the other. Given that there is only linear movement between the components, the distance between the sensor and the bar will be proportional to the distance between the two machine components. A simple calculation based on the angle of the bar and the distance from the sensor to the bar determines the corresponding separation of the two parts.

6 Claims, 4 Drawing Sheets

NON-CONTACT LINEAR POSITION TRANSDUCER FOR AN INJECTION MOLDING MACHINE AND METHOD OF USING

BACKGROUND OF THE INVENTION

1. Field of the Invention

The present invention relates to an improved method and apparatus for measuring relatively long, linear distances. More particularly, the present invention relates to method and apparatus for determining the distance between two components of an injection molding machine that are capable of relative (linear) movement.

2. Description of the Related Art

In the course of operating an injection molding machine, it is necessary to have accurate data concerning the position of various machine components. For example, the positioning of the injection unit relative to the mold, the distance that the screw moves within the barrel of the injection unit during injection, the length of stroke for the ejector mechanism, and the distance between the stationary and moving platens during operation of the clamp mechanism.

Considering specifically the position of the moving platen, for example, there are several aspects of operation where precise control is important. As the moving platen changes position to open/close the mold, efficient operation requires position feedback to identify such things as: (a) the position where the mold portions touch, (b) a suitable point to change from rapid traverse to a slower speed just before mold touch, and (c) the position to be maintained when the clamp is at full tonnage. Consistent, accurate information for these positions is necessary to enable the control to minimize cycle times while safely producing acceptable parts. Typically, prior art arrangements use mechanical position transducers, such as limit switches and linear or rotary potentiometers that have contacting components subject to mechanical wear and decreasing accuracy over time.

Various non-contact sensing systems, such as those based on photo sensing or magnetic sensing technology, are known to provide accurate position feedback for relatively short distances. However, given the small operating range (typically less than one inch) for sensors of this type, they have not been useful in determining the position of various components in injection molding machines.

Accordingly, it is an object of the present invention to overcome the deficiencies in the prior art arrangements, and to provide an improved method and apparatus for accurate measurement of linear distances in an injection molding machine which avoids the use of components that are subject to mechanical wear and breakdown.

SUMMARY OF THE INVENTION

Briefly stated, the present invention utilizes a non-contact sensing system, such as photo sensing or magnetic sensing technology, for indirectly measuring the relatively long, linear distances associated with the operation of an injection molding machine; an application where such technology would not normally be practical. In particular, the method and apparatus of the present invention can be used to determine the distance between two machine components or systems that are capable of relative (linear) movement.

More specifically, the apparatus includes a rigid reference bar that extends over the distance traversed by the components of interest, the bar being oriented at a slight angle relative to the path of movement. Immediately adjacent the bar is a sensing element capable of accurately determining the relatively short distance between this sensor and the bar. If appropriate, the reference bar can be connected to one of the machine components and the sensor mounted on the other. In any event, either the bar or the sensor could be considered as stationary with respect to the movement of the other, whichever is convenient from a design perspective. Given that there is only linear movement between the components, the distance from the sensor to the bar will be proportional to the distance between the two components regardless of linear position. A simple calculation based on the angle of the bar and the distance from the sensor to the bar will determine the corresponding separation of the two parts.

DESCRIPTION OF THE PREFERRED EMBODIMENTS

Figure 1:
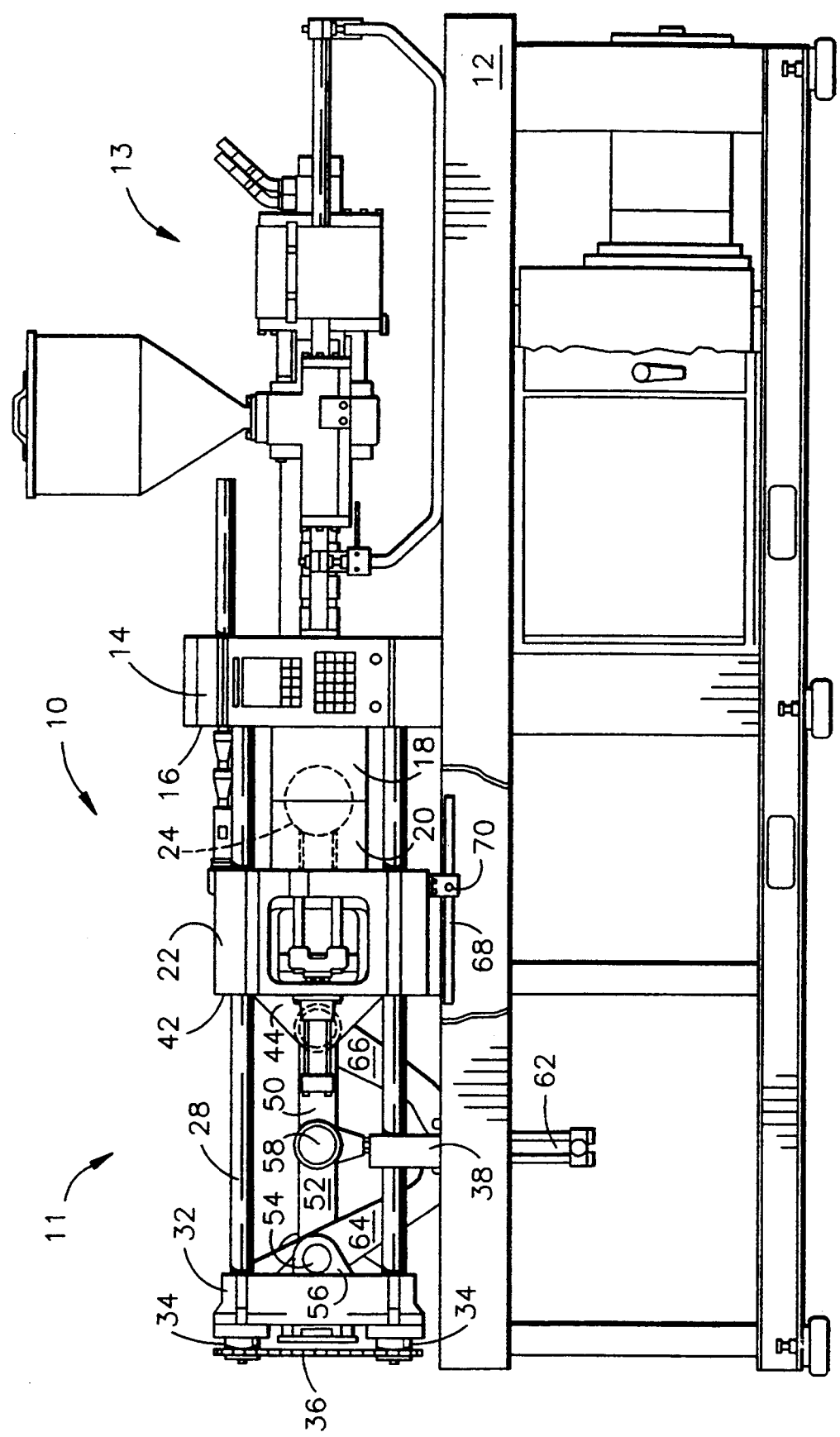
FIG. 1 is a side elevational view of an injection molding machine including a linear position transducer in accordance with the present invention, and showing a toggle clamping mechanism in its fully extended position with the mold portions in contact with each other.

Referring now to the drawings, and particularly to FIG. 1, there is shown an injection molding machine 10, the structure of which will be described in some detail to clarify the interaction of the components of the present invention. Specifically, the injection molding machine 10 includes a base 12 that supports an injection unit 13 for plasticating a thermoplastic material into a flowable, viscous state and injecting the plasticated material into a mold cavity 24 defined by a pair of cooperating mold portions 18,20 that are movable relative to each other to open and close selectively the mold cavity 24.

Mold portion 20 is supported for movement toward and away from mold portion 18 by a mold traversing and clamping system 11 that includes a stationary platen 14 connected to base 12 to support securely mold portion 18. Mold portion 20 is secured to a moving platen 22 that is slidably carried on tie rods 28 that extend between stationary platen 14 and a die height platen 32, which is carried on base 12. Mold traversing and clamping system 11 is a toggle-type system that is provided for traversing mold portion 20 toward and away from mold portion 18, and for securely holding together mold portions 18 and 20 when the plasticated material is injected into and contained within mold cavity 24 under high pressure.

The mold traversing and clamping system 11 is mounted on machine base 12, which is generally rectangular in form and of a construction that is well known to those skilled in the art. Stationary platen 14, which is a generally rectangular structure, is rigidly secured to base 12 and includes a planar face 16 to which mold portion 18 is securely connected.

Figure 2:
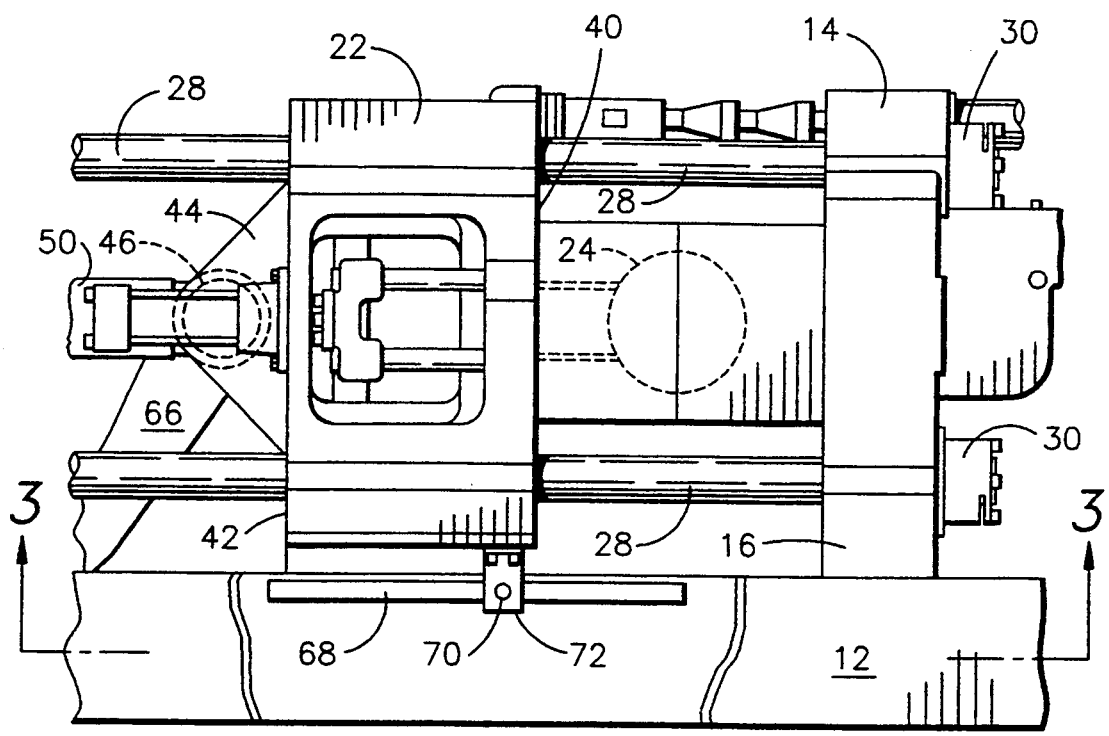
FIG. 2 is an enlarged partial side view of the injection molding machine shown in FIG. 1.
Figure 4:
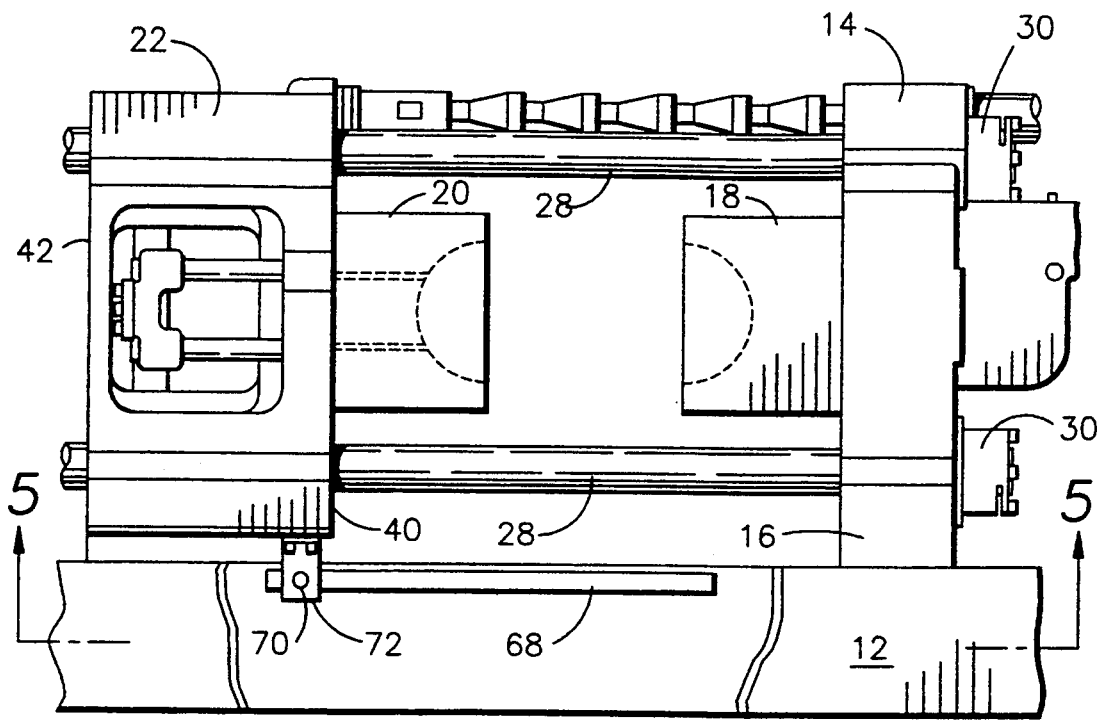
FIG. 4 is a side elevational view similar to that of FIG. 2, but showing the clamp at its fully retracted position with the mold portions open.

Positioned adjacent stationary platen 14 on the side opposite from face 16 is injection unit 13, only a small portion of which is shown in FIGS. 2 and 4, which plasticates solid or powder thermoplastic material to provide a molten, flowable mass suitable for injection into mold cavity 24. Injection unit 13 includes a tubular barrel that carries a rotatable screw (not shown) to aid in plasticating the material, to convey material toward mold cavity 24, and to inject the material into mold cavity 24 under high pressure. Since the structure and operation of the plastication and injection unit 13 are well known to those skilled in the art and not critical to the understanding of the present invention, no further description of that unit will be provided herein.

Four parallel, cylindrical tie rods 28 are provided and have their respective longitudinal axes disposed in a generally rectangular array. Tie rods 28 extend from face 16 of stationary platen 14, and an end of each tie rod 28 is secured in position relative to stationary platen 14, as by means of nuts 30 (see FIG. 2). The opposite ends of tie rods 28 carry a die height platen 32, which remains essentially stationary during the molding cycle. However, die height platen 32 is shiftable toward and away from stationary platen 14 by means of adjusting nuts 34 that are rotatably carried by die height platen 32 and that can be rotated by a motor driven chain 36 that passes around and drives the sprockets operatively connected to adjusting nuts 34. Adjusting nuts 34 engage external threads formed on the ends of tie rods 28 and are threadedly carried by the associated tie rod 28 so that rotation of nuts 34 causes die height platen 32 to be moved linearly relative to stationary platen 14 in order to accommodate molds of different thicknesses. The two lowermost tie rods 28 are held in position, generally parallel to machine base 12 at a point near die height platen 32 by respective tie rod supports 38, only one of these being visible in FIG. 1.

Moving platen 22 is slidably carried on tie rods 28 and is positioned between die height platen 32 and stationary platen 14. Moving platen 22 includes a front face 40 that is opposite face 16 of stationary platen 14, and carries mold portion 20. The mold portion 20 engages mold portion 18 to define one or more mold cavities 24 into which the molten thermoplastic material is injected to form the desired parts. Rear face 42 of moving platen 22 carries a plurality of vertically extending, laterally spaced pillow blocks 44 that have aligned bores to carry rotatably a front pivot pin 46 which is a part of the toggle type clamping apparatus 11 for advancing or retracting moving platen 22 with respect to stationary platen 14.

The toggle type clamping apparatus 11 is in the form of a conventional single toggle arrangement that includes a pair of toggle front links 50 that have one end carried on front pivot pin 46, and a pair of toggle rear links 52 that have one end pivotally carried on a rear pivot pin 54. Pin 54 is, in turn, carried in aligned bores formed in each of a plurality of vertically extending, laterally spaced die height platen pillow blocks 56. The respective toggle front and rear links are inter connected at their innermost free ends by a center pivot pin 58 that is operatively connected with a toggle actuator, such as the piston rod (not shown) of a hydraulic cylinder 62. For the clamping apparatus 11 as illustrated, cylinder 62 is supported from a crossmember (not shown) that is pivotally connected with a pair of support links 64,66 that have their opposite ends respectively pivotally carried by rear pivot pin 54 and front pivot pin 46.

In FIGS. 1 and 2, moving platen 22 is shown in its fully extended (closed) position relative to die height platen 32. The toggle actuator has been operated (the piston rod extended to its uppermost position) to cause the axis of center pivot pin 58 to lie on a line extending between the axes of front and rear pivot pins 46 and 54, so that respective toggle links 50 and 52 are coaxial. When moving platen 22 is in the position shown in FIG. 2, mold portions 18 and 20 are in contact and define mold cavity 24, into which the molten thermoplastic material is injected under high pressure. The aligned toggle links 50 and 52 serve to maintain the position of moving platen 22 relative to stationary platen 14, so there is no separation of the mold portions 18, 20 due to the force imposed on the surfaces of the mold cavity 24 by the injected material. After the injected material has cooled sufficiently, the toggle actuator is operated in reverse (the piston rod retracted into cylinder 62), thereby drawing center pivot pin 58 toward cylinder 62 and causing moving platen 22 to move away from stationary platen 14 and toward the die height platen 32, to separate the mold portions and permit the molded part to be removed from mold cavity 24.

Figure 5:
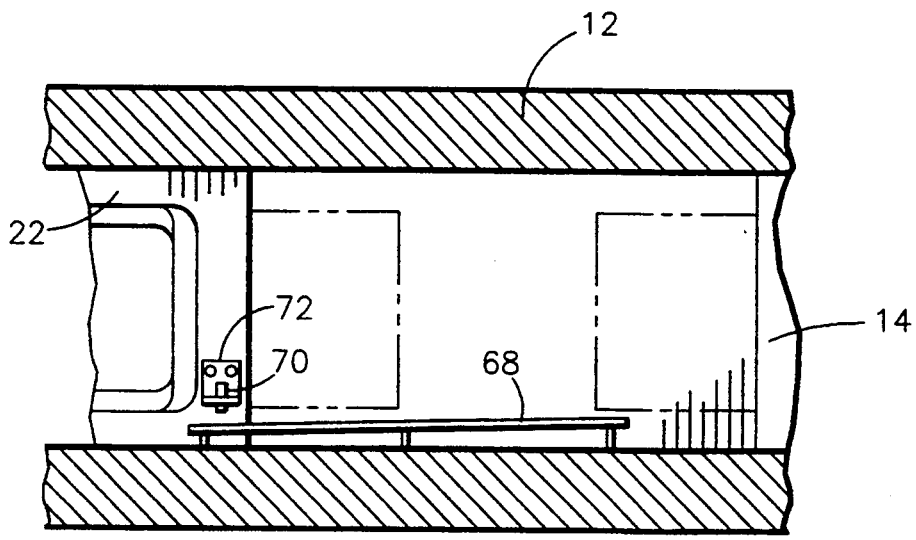
FIG. 5 is a partial sectional view of the structure as shown in FIG. 4, taken along the line 5—5.

In the position shown in FIGS. 4 and 5, moving platen 22 is completely retracted (open) and is in its furthest position relative to stationary platen 14. In that position, the piston rod is fully retracted into cylinder 62 and toggle front and rear links 50, 52 are angularly oriented.

Figure 3:
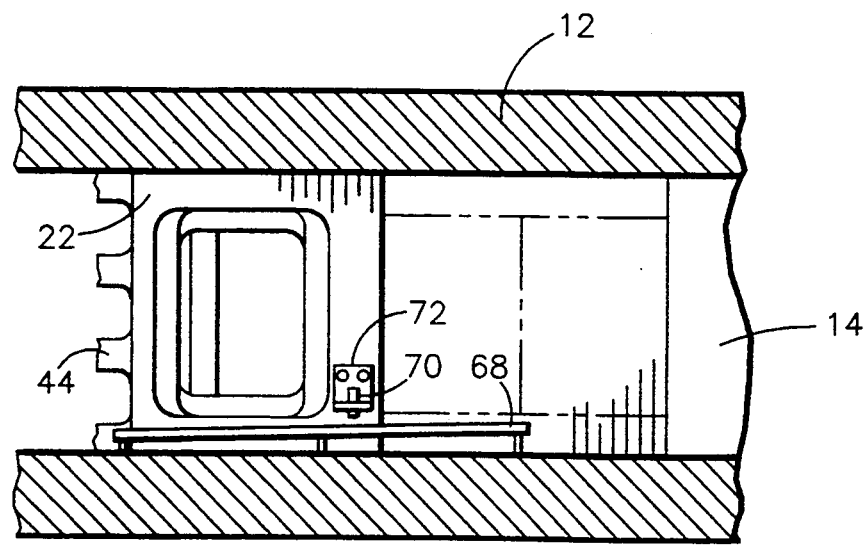
FIG. 3 is a partial sectional view of the structure as shown in FIG. 2, taken along the line 3—3.

In the embodiment shown in the drawings, the present invention is used to determine the position of the moving platen 22 relative to the stationary platen 14. To provide a convenient, consistent, longitudinal reference, the injection molding machine is provided with a rigid bar 68 that is attached securely to base 12; note that the stationary platen 14 is also connected to base 12, as described previously. The particular material from which the bar 68 is formed is not critical, as long as it is compatible with the selected sensor technology. The bar 68 is of sufficient length to equal the approximate maximum traverse of moving platen 22, and of sufficient width to provide a suitable target for a sensor 70, as will be more fully described later. In addition, the surface of the bar 68 is smooth and flat to optimize the effectiveness of its function as a target surface for the sensor 70. As seen in FIGS. 3 and 5, the bar 68 is preferably attached on the back side of base 12 (the side opposite the control) to minimize potential interference with parts removal and/or ejection from the mold cavity 24. Since the bar 68 serves as a reference surface, it is important that it be mounted to the base so that there is minimal effect from the surrounding conditions, such as variations or fluctuations in the ambient temperature.

Figure 6:
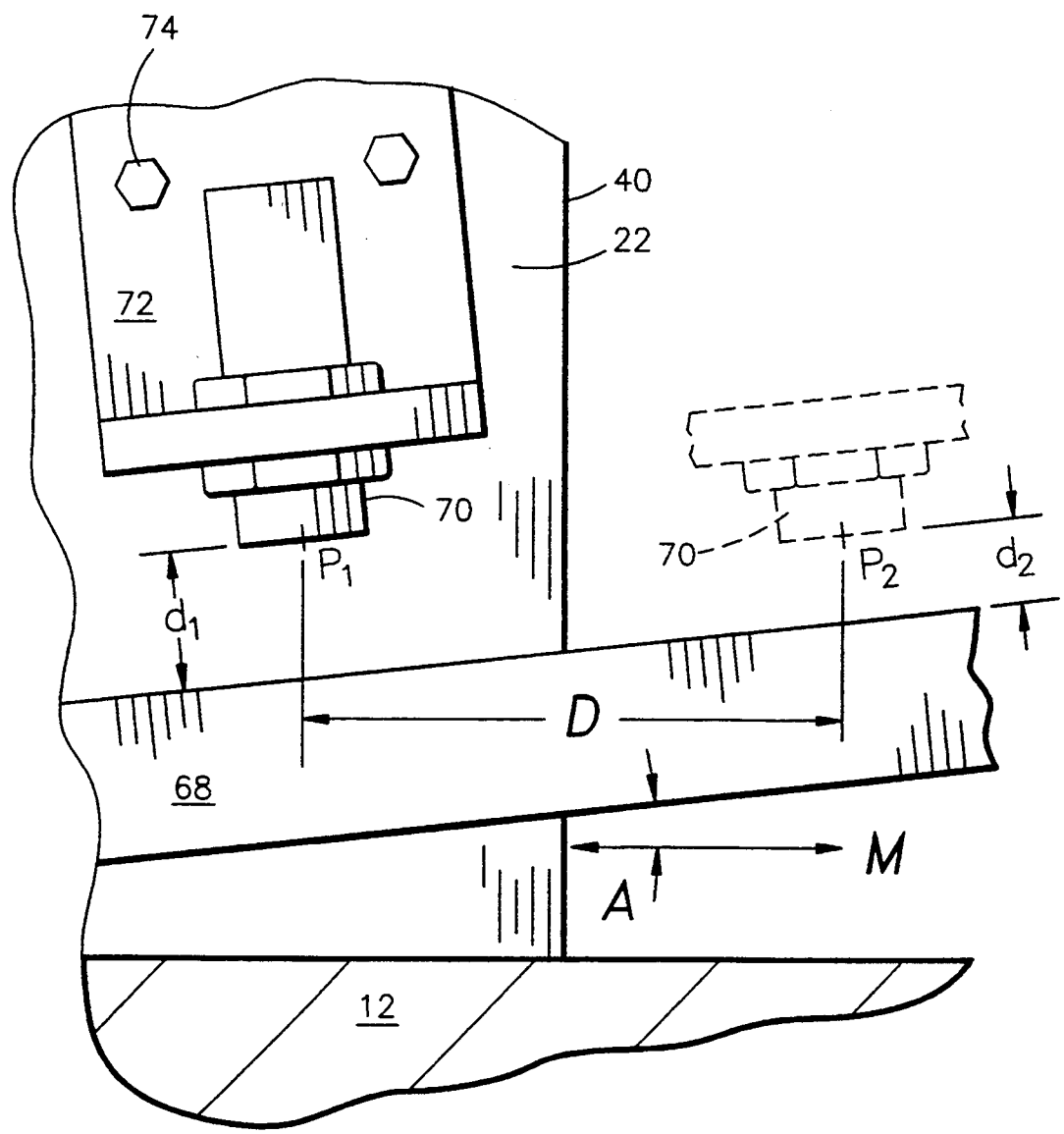
FIG. 6 is an enlarged partial view of the structure shown in FIG. 5, illustrating in greater detail a sensor and reference bar according to the present invention.

Reference bar 68 is positioned so that its axial centerline is parallel to a horizontal plane and offset or angled with respect to the vertical plane defined by the line of movement M of platen 22, see FIGS. 2–6, particularly FIG. 6. The amount of angle or offset in bar 68 from the base 12, depends on the sensitivity of sensor 70. Specifically, the change in the distance between the sensor 70 and the bar 68 over the total distance traversed by moving platen 22 must fall within the sensitivity range of the sensor 70. For example, if the sensitivity range of the sensor is 0.5 inches, the offset or differential of the bar 68 as determined by the angle at which it is mounted, cannot exceed 0.5 inches over the entire length of the bar 68.

Magnetic sensing technology has proven to provide accurate data from sensor 70. However, it is contemplated that other sensing devices, such as optical sensors, could also be used with satisfactory results. Sensor 70 is attached beneath moving platen 22 at a position opposite reference bar 68. Suitable mounting means are provided for sensor 70, such as an L-shaped bracket 72 attached by screws 74 to the lower surface of moving platen 22. The mounting must be rigid and secure so that there is no inadvertent movement or excessive vibration of the sensor 70 during traverse of platen 22. In addition, it is preferable to align sensor 70 so that it is approximately perpendicular to the bar 68; this will provide a more consistent target surface area for sensor 70.

As is apparent from the drawings, linear motion of platen 22, indicated by arrow M in FIG. 6, will cause a the distance between sensor 70 and reference bar 68 to change. The geometry of the relevant components dictates that the distance traversed by platen 22 will be directly proportional to the corresponding change in distance between sensor 70 and reference bar 68. This relationship can be defined as follows where the moving platen 22 travels between two points, $P_1$ and $P_2$ (the position of the sensor 70 at $P_2$ is shown in broken lines:

$$D = (d_1 - d_2)/\sin A$$

where:

D = distance between $P_1$ and $P_2$
$d_1$ = distance between sensor and bar at $P_1$
$d_2$ = distance between sensor and bar at $P_2$
A = angle of bar with respect to line of movement of platen 22

Using this algorithm, the control instantaneously determines the relative linear movement based on the distance given by the sensor 70.

To take full advantage of the capabilities of the position sensing provided by the present invention, it is desirable to calibrate the relationship of the sensor 70 and bar 68 as assembled in a particular injection molding machine. One approach is to attach bar 68 to base 12 with a mounting means that maintains the straightness of bar 68 and also provides precise angular positioning at a predefined, constant angle. With this approach, the control would be used to take readings at the full open and full close positions of moving platen 22; intermediate positions could be then determined on the basis of the angle of the bar 68, using the stated algorithm. Alternatively, the bar 68 could be installed at an approximate angle and readings taken by the control over a defined traverse distance to establish two sides of a right triangle and thereby determine the actual angle of the bar 68 (as assembled); subsequent measurements would be based on that calculated angle. Conceivably, a series of measurements could also be taken along the length of the bar 68 at defined distances to take into account any variations of straightness and adjust measurement calculations accordingly.

The apparatus of the present invention thus provides for accurate position measurement by means of calculating the distance traversed based on a known distance to a reference surface. Although particular embodiments of the present invention have been illustrated and described, it will be apparent to those skilled in the art that various changes and modifications can be made without departing from the spirit of the present invention. For example, a similar reference bar and sensor arrangement could be used in conjunction with the injection unit to determine its position relative to the mold. Alternatively, as noted previously, other types of non-contact sensors can be used to provide acceptable input regarding the distance between the sensor and reference surface. It is therefore intended to encompass within the appended claims all such changes and modifications that fall within the scope of the present invention.

What is claimed is:

1. In an injection molding machine having multiple machine elements, apparatus for determining the distance between first and second machine elements that are disposed for relative linear movement comprising:
    (a) a reference member associated with the first machine element, the reference member having a straight surface positioned at an oblique angle with respect to a line defined by the relative movement of the first and second machine elements;
    (b) a sensing device associated with the second machine element for generating output signals representative of the distance between the sensing device and the straight surface of the reference member, the sensing device being positioned in proximity to the straight surface of the reference member such that the distance between the sensing device and the surface varies proportionately with the distance between the first and second machine elements; and
    (c) control means for receiving the output signals from the sensing device and determining the distance between the first and second machine elements as a function of the distance measured by the sensing device and the angle of the reference member to the line of movement.

2. The apparatus of claim 1 wherein the first machine element is a stationary platen and the second machine element is a moving platen.

3. The apparatus of claim 1 wherein the sensing device is a linear analog sensor.

4. The apparatus of claim 3 wherein the sensing device is inductive.

5. The apparatus of claim 3 wherein the sensing device is optical.

6. In an injection molding machine having first and second machine elements that are disposed for relative linear movement, a reference member having a straight surface associated with the first machine element, and a sensing device associated with the second machine element for generating output signals representative of the distance between the sensing device and the straight surface of the reference member, a method for determining the distance between the first and second machine elements comprising the steps of:
    (a) aligning the straight surface of the reference member at an oblique angle with respect to a line defined by the relative movement of the first and second machine elements,
    (b) positioning the sensing device in proximity to the straight surface of the reference member such that the distance between the sensing device and the surface varies proportionately with the distance between the first and second machine elements, (c) measuring the distance between the sensing device and the straight surface of the reference member at a first position of the machine elements, (d) measuring the distance between the sensing device and the straight surface of the reference member at a second position after relative movement between the machine elements, and (e) determining the distance between the first and second machine elements as a function of the distance measured by the sensing device and the angle of the reference member to the line of movement.

* * * * *